United States Patent [19]

Morrison

[11] 4,081,891
[45] Apr. 4, 1978

[54] METHOD OF MAKING A VALVE

[75] Inventor: Bertram L. Morrison, Houston, Tex.

[73] Assignee: ACF Industries, Incorporated, New York, N.Y.

[21] Appl. No.: 787,173

[22] Filed: Apr. 13, 1977

Related U.S. Application Data

[62] Division of Ser. No. 644,233, Dec. 24, 1975, Pat. No. 4,034,959.

[51] Int. Cl.² .................. B23P 15/00; F16K 3/02; B32B 1/10; B32B 1/06
[52] U.S. Cl. .................. 29/157.1 R; 156/293; 156/308
[58] Field of Search .................. 29/157.1 R; 251/306, 251/314, 315, 359, 328, 364; 156/293, 308; 277/227

[56] References Cited

U.S. PATENT DOCUMENTS

| 695,153 | 3/1902 | Hoyt | 156/293 |
|---|---|---|---|
| 2,600,497 | 6/1952 | Hamer | 251/364 |
| 3,098,698 | 7/1963 | Glynn | 156/293 |
| 3,409,269 | 11/1968 | Fawkes | 251/306 |
| 3,447,781 | 6/1969 | Fawkes | 251/315 |
| 3,544,066 | 12/1970 | Fawkes | 251/306 |
| 3,671,010 | 6/1972 | Scaramucci | 251/317 |
| 3,726,504 | 4/1973 | Kormos et al. | 251/306 |
| 3,958,314 | 5/1976 | Kurkjian, Jr. | 251/306 |
| 4,006,882 | 2/1977 | Bonafous | 251/306 |

Primary Examiner—C.W. Lanham
Assistant Examiner—Daniel C. Crane

[57] ABSTRACT

A valve comprised of a valve body having a body with flow passages therethrough and a valve member mounted therein movable between open and closed positions. An annular groove in the body around a flow passageway has an open end, a closed end, and a pair of divergent side walls with the groove width at the closed end portion being greater than the width at the open end. An annular seal is positioned in the groove. A chemical fastener in the groove secures the seal ring in the groove. A method of making the valve seal structure includes forming the groove with divergent side walls in a seal ring supporting position of a valve body and then partially filling the groove with a chemical fastener material. The seal ring is inserted into the groove within the chemical fastener material and the chemical material is cured to secure the seal ring in the groove.

1 Claim, 15 Drawing Figures

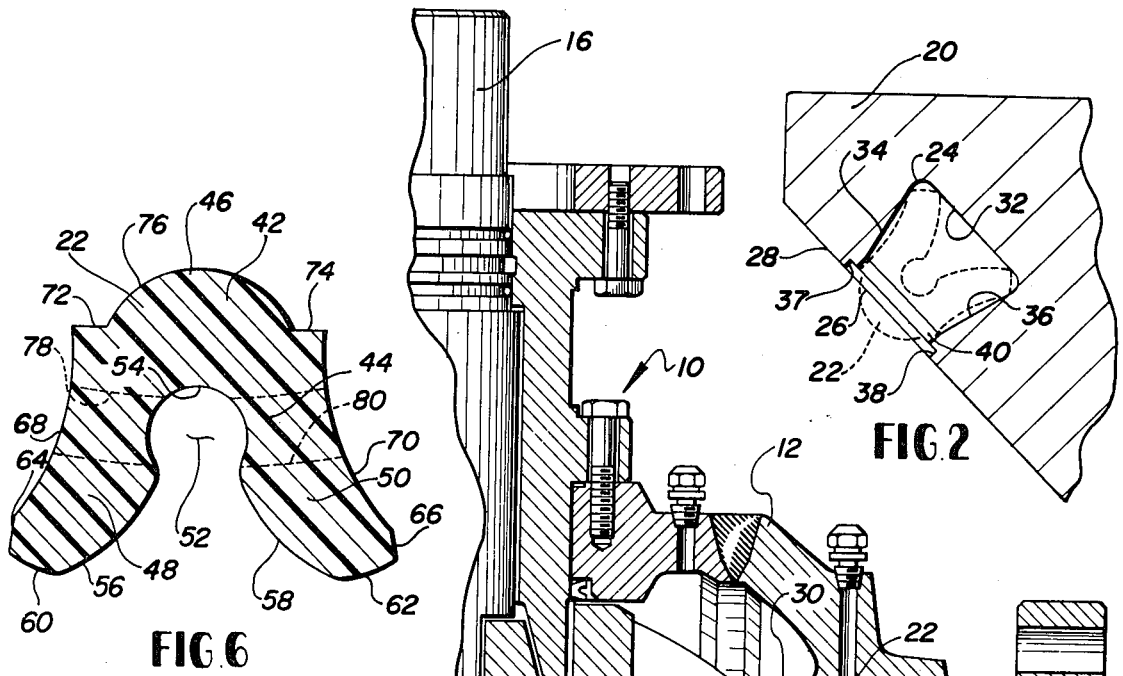
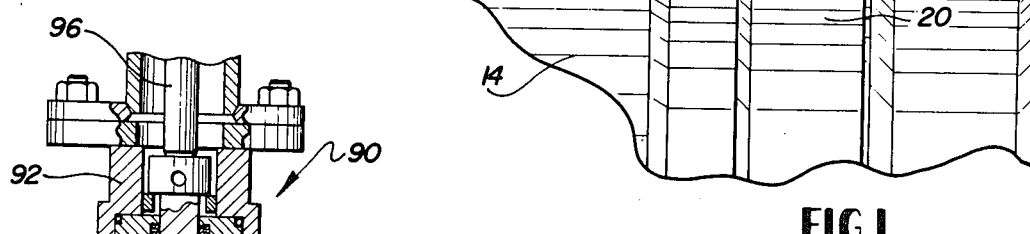
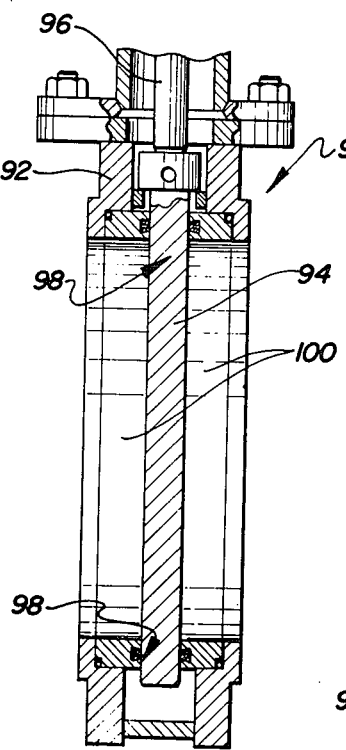
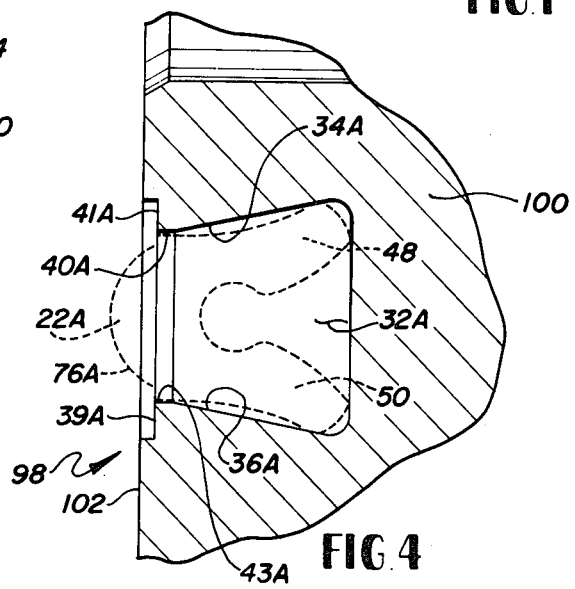

METHOD OF MAKING A VALVE

This is a division of application Ser. No. 644,233, filed Dec. 24, 1975, now U.S. Pat. No. 4,034,959.

BACKGROUND OF THE INVENTION

This invention is related to mounting structures for valve seals that have a seal ring mounted in a groove.

In the prior art valve seal rings are typically pressed into grooves in a valve body or in a support ring structure or they are placed in grooves in a floating relationship and urged outwardly by a spring or the seal ring itself. In the pressed in or interference fit constructions the sizing of the seal ring and the groove is quite critical in order to provide a proper fit. In these constructions, once a seal ring has been installed, it is difficult if not substantially impossible to remove it for replacement. In constructions where the seal ring floats in a groove, tolerances of the parts are also critical so the floating action is accomplished. Additionally, the floating constructions require springs or special resilient constructions of the seal ring. While the latter construction is easily replaceable, usually it has a disadvantage in that it can become quite expensive and subject to failure due to the moving parts involved. One additional construction in prior art valve seal rings is to provide a movable seal ring in a groove and a passageway from the groove to the exterior of the valve body so that a sealing compound can be injected behind the seal ring to urge it outward and into contact with the valve member. While this construction has the advantage of providing an easily replaceable sealing ring and being an adjustable seat it does not insure that the seal ring is kept in a fixed position or that it is constantly urged in one direction as is required under some operating conditions for proper sealing.

SUMMARY OF THE INVENTION

In an embodiment of the valve seal structure of this invention, an annular groove is provided around the flow passageway in a valve body or a seal supporting member in a valve body which has a pair of divergent side walls extending between the open and closed ends of the groove so that the groove is wider at the closed end than at the open end. An annular seal ring is positioned in the groove contacting the valve member, and a chemical fastener in the groove secures the seal ring in the groove. One structural embodiment of the seal ring has an inner annular portion and an outer annular portion which are divergent and which lie adjacent to the divergent side walls of the groove. Another structural embodiment of the seal ring has a plurality of grooves on its opposed sides to cooperatively engage the chemical fastener material. The method of manufacture of this invention briefly stated includes forming a groove as described above in a seal ring supporting portion of a valve, then placing a chemical fastener material in the groove, and inserting an annular seal ring into the groove so the chemical fastener will form itself around the seal ring in the groove. Finally the chemical fastener material is cured to secure the seal ring in the groove.

One object of this invention is to provide a valve seal ring structure and method of making same which overcomes the aforementioned disadvantages of the prior art devices.

Still, one other object of this invention is to provide a valve seal ring structure having a seal ring which is secured in a groove by using a chemical fastener as a structural medium to mount and retain the seal ring in combination with structural characteristics of the groove.

Still another object of this invention is to provide a seal ring structure for a valve which can be easily manufactured and assembled because it does not require precise machining and is easily installed in a production environment.

Yet, another object of this invention is to provide a seal ring structure which has a firmly supported seal ring, and wherein the sealing ring can be easily replaced.

Various other objects, advantages, and features of this invention will become apparent to those skilled in the art from the following discussion, taken in conjunction with the accompanying drawings, in which:

DESCRIPTION OF THE DRAWINGS

FIG. 1 is a cutaway view of a portion of a ball valve employing an embodiment of the seal ring of this invention in a seal ring support member in the valve body;

FIG. 2 is an enlarged cross-sectional elevation view of the groove containing portion of the valve seat ring for the valve shown in FIG. 1 with a seal ring shown in dashed lines in the groove.

FIG. 3 is a cutaway elevation view of a portion of a gate valve employing the same embodiment of a seal ring structure of this invention as shown in the valve depicted in FIG. 1;

FIG. 4 is a cross-sectional elevation view of a portion of the seat ring for the gate valve shown in FIG. 3 with the seal ring groove shown therein having a seal ring shown in dashed lines in the groove;

FIG. 6 is a transverse cross-sectional elevation view of the embodiment of a seal ring shown in FIGS. 1-4 with the seal ring shown removed from the valve;

Figure 7:
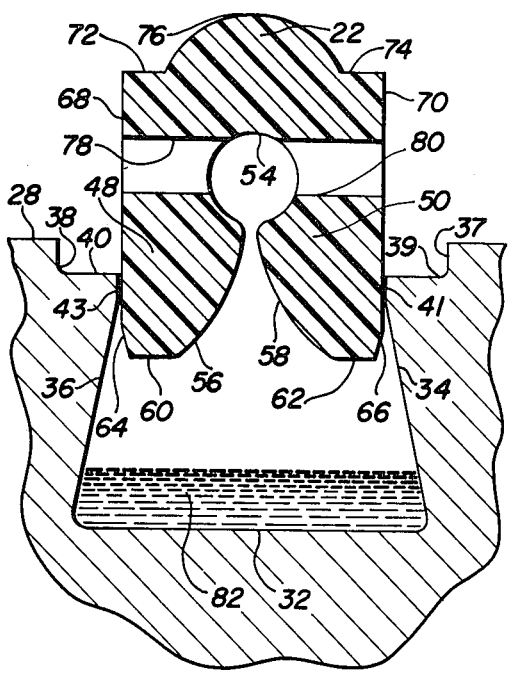
FIG. 7 is a cross-sectional elevation view of a member having the groove therein with the chemical fastener material in the closed end of the groove, and having the seal ring member as shown in FIG. 6 positioned in an upper portion of the groove illustrating the relative position of the components as the seal ring is inserted into the groove.

The following is a discussion and description of preferred specific embodiments of the seal ring structure and method of manufacture of this invention with such being made with reference to the drawings where upon the same reference numerals are used to indicate the same or similar parts and/or structure. It is to be understand that such discussion and description are not to unduly limit the scope of the invention.

DETAILED DESCRIPTION

The seal ring structure of this invention is shown herein in two structural embodiments with each being shown in a gate valve and a ball or spherical plug valve. The method of manufacture is described in detail with the first structural embodiment.

FIG. 1 illustrates a ball or spherical plug valve 10 employing the novel seal ring structure of one embodiment, (1), of this invention. Ball valve 10 includes a body 12 enclosing a ball or spherical plug 14 which is rotatably moved by a stem 16 extending from ball 14 through valve body 12. The seal ring structure of this invention is indicated generally at 18 and located in a movably mounted seat ring 20 in valve body 12.

FIG. 2 shows in detail seal ring structure 18 for valve 10 wherein a seal ring indicated at 22 is shown in dashed lines in a groove 24 in seat ring 20. Seat ring 20 surrounds the flow passageway through valve body 12 and seal ring 22 and groove 24 are in a portion of seat ring 20 which faces ball 14. Groove 24 has an open end portion 26 opening to surface 28 which faces spherically shaped portions 30 on ball 14. Groove 24 has also a bottom or closed end portion 32 forming a bottom wall of the groove. Groove 24 is constructed with opposed side walls 34 and 36 which are divergent from the open end portion in the direction of the closed end portion 32 wherein the wideth of closed end portion 32 or bottom wall is greater than that of the open end portion 26. Groove open end portion 26 has a recessed portion extending in to seat ring 30 from surface 28 a small distance. This recessed portion has sides 37 and 38 joining inwardly extending ledge portions 39 and 40 which in turn join narrower side wall portions 41 and 43 extending further into the material and adjoining divergent side walls 34 and 36. It is to be noted with significance that groove 24 can be machined to a rough machined state only and need not be finished to close tolerances. Close tolerances are not necessary for groove 24 because the chemical fastener will allow adjustment and positioning of seal ring 22 to its final position. Seal ring 22 is firmly supported in groove 24 and has a smooth sealing surface portion thereof extending beyond surface 28 and in contact with spherically shaped surface portions 30 on spherical plug 14 to effect sealing in the valve.

FIG. 6 shows seal ring 22 by itself in a transverse cross-sectional view in its free or unrestrained position removed from the valve. Seal ring 22 has an inner end portion 42, which is the end portion thereof which will lie closest to the valve member when installed, and has an outer portion 44, which is the portion of the seal ring that is oriented away from the valve member when the seal ring is installed. Seal ring inner portion 42 has a convex portion 46 forming the inner end portion thereof. The surface of convex portion 46 in use contacts the sealing surfaces of the valve member. Seal ring outer portion 44 is formed into two opposed portions which appear somewhat as legs when viewed as shown in FIG. 6. These opposed portions are referred to herein as an inner annular portion 48 and an outer annular portion 50 because they are annular with one being disposed within the annulus of the other relative to the valve's flow passageway. A space 52 is formed between inner annular portion 48 and outer annular portion 50. The innermost portion of space 52 has an arcuate surface portion 54 shaped such that the portion immediately outward of this inner portion is slightly narrower than the widest portion of the innermost closed end portion of space 52. The surface of seal ring 22 immediately outward of the arcuate surface 54 is divergent in opposed directions in two smoothly curved cross-sectionally convex surfaces 56 and 58 on inner annular portion 48 and outer annular portion 50, respectively. The outer ends of the annular portions 48 and 50 each have substantially flat end surfaces 60 and 62, respectively, which join other flat surfaces 64 and 66 on the outwardly disposed sides of the annular portions, respectively, which in turn join the other larger sides 68 and 70, respectively, that extend to seal ring inner portion 42. It is to be noted that inner portion 42 has flat surfaces 72 and 74 joining side surfaces 68 and 70, respectively, which extend inwardly toward a center portion of that end of the seal ring and join a convex valve member contact surface 76. A pair of transversely positioned passageways 78 and 80 extend through inner annular portion 48 and outer annular portion 50 respectively as shown joining an inner portion of space 52 with the zones immediately outward of sides 68 and 70. Seal ring 22 is formed by a process of extruding or molding, or some other method such that it has the cross-sectional free form shape as shown in FIG. 6. It is to be understood that seal ring 22 can be molded into an annular form in a continuous piece or it can be formed in a rope-like fashion and spliced to the desired dimension.

Figure 8:
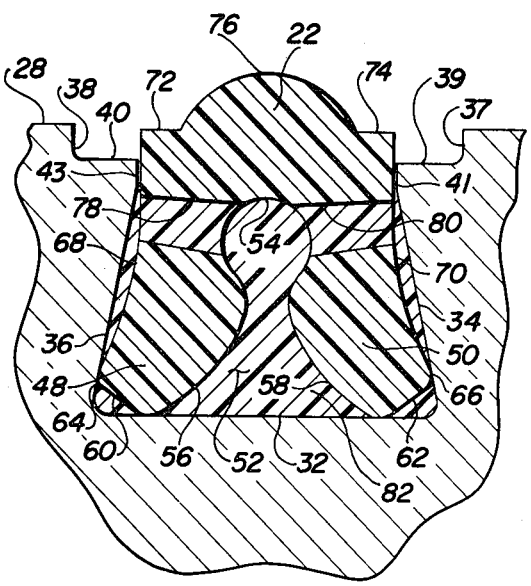
FIG. 8 is a cross-sectional view of the grooved member and the seal ring shown in FIG. 7 with the seal ring positioned in the groove in the position it assumes prior to being displaced into its final resting position.

FIG. 7 shows seal ring 22 being inserted into the groove. A chemical fastener material 82 is placed in the closed end portion or bottom of the groove prior to inserting seal ring 22. At this point it is to be noted that chemical fastener material 82 is a flowable material and can have a consistency of somewhere between a liquid and semi-solid. Obviously, the specific consistency of the chemical fastener material will depend upon the specific material used and this will vary depending upon the application for a particular valve and the material of construction of seal ring 22. The amount of chemical fastener material 82 which is placed in the groove must be at least sufficient to fill all of the space in the groove between the groove bottom 32 and side walls 34 and 36 which will not be occupied by seal ring 22 when it is positioned in its final resting position. In order to place seal ring 22 in the open end position of the groove, inner annular portion 48 and outer annular portion 50 must be moved toward each other and inserted in the groove. Once the annular portions of seal ring 22 are placed in the open end portion of the groove, then the seal ring is moved into the groove to a position substantially as shown in FIG. 8. As seal ring 22 moves into the groove, the annular portions 48 and 50 spread out with their outer ends moving into the corners of the groove and thereby displacing chemical fastener material 82 into upper portions of the groove and through space 52 and passages 78 and 80 to fill all the space in the groove which is not occupied by seal ring 22. Air entrapped in the groove below seal ring 22 escapes through passageways 78 and 80 as chemical fastener 82 moves into the passageways filling them. Seal ring 22 in its initial resting position as shown in FIG. 8 has convex surface 76 displaced outward relative to the groove from its final mounted and secured position.

Figure 9:
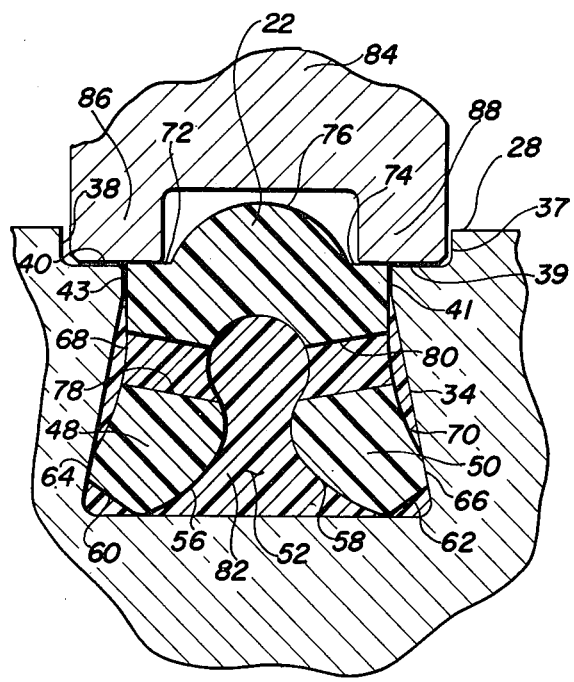
FIG. 9 is a cross-sectional view of the grooved member shown in FIGS. 7 and 8 with an assembly fixture shown in contact with the grooved member and the seal ring to hold the seal ring in its final resting position for curing of the chemical fastener material.
Figure 5:
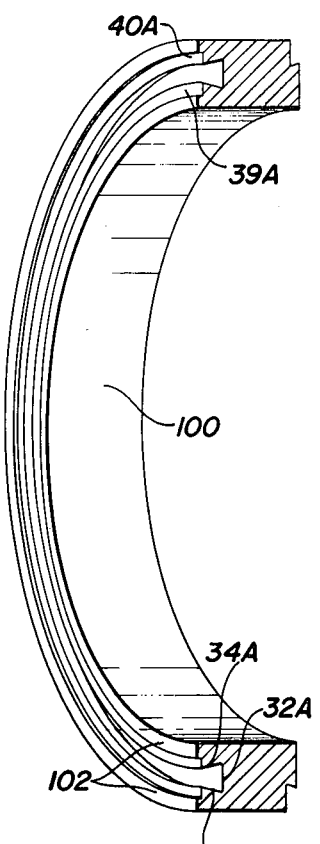
FIG. 5 is a perspective view of a portion of the seat ring for the gate valve shown in FIG. 3.

FIG. 9 shows seal ring 22 positioned in the groove and held in its final resting position by an assembly fixture 84. Assembly fixture 84 is an annular structure having a pair of concentric annular projections 86 and 88 extending from one side which are spaced to contact surfaces 72 and 74 on seal ring 22 and recessed surfaces 39 and 40 adjacent the open end of the groove. Assembly fixture 84 is used to hold seal ring 22 and chemical fastener material 82 in place while the chemical fastener material cures, then assembly fixture 84 is removed. When assembly fixture 84 presses seal ring 22 into the groove, then chemical fastener material 82 is squeezed and thus forced to flow around seal ring 22 filling all voids in the groove. Excess chemical fastener material will exit the groove between side walls 68 and 70, and respective groove side wall portions 43 and 41 at the innermost portions of seal ring 22. Before assembly fixture 84 is pressed into place a suitable release agent can be applied to its surfaces which may come in contact with the chemical fastener material. Also a release agent can be applied to surfaces 28, 38, 40, 72, 74, 39 and 37 prior to using assembly fixture 84 so the chemical fastener will adhere only where desired. If a non-adhering type of chemical fastener is used then no release agent is necessary. Assembly fixture 84 can be left in place until the chemical fastener material has completely cured or until it has substantially cured to a state which will retain ring 22 in its final resting position in the groove.

The specific chemical fastener material to be used in this invention depends upon the service environment for a particular valve and the specific material from which seal ring 22 is constructed. In general, for a great many uses of valves, the seal rings are made of elastomeric materials or plastic materials. In regard to the novel seal ring and mounting of this invention at least four distinct possible variations are obtainable. One combination is a seal ring made of a substantially non-porous and substantially deformable plastic material suitable for valve seals and a chemical fastener material being a substantially rigid curing material which will not bond to the seal ring or to the material forming a groove. In this combination the seal ring is retained in the groove by a wedging action of the chemical fastener against the groove walls and the seal ring. A second possible combination is a seal ring constructed of a non-porous elastic material and a chemical fastener material being a substantially rigid curing material which will bond to the seal ring and to the material forming the groove to secure the seal ring in the groove. A third possible combination is a seal ring constructed of a non-porous elastomeric material and a chemical fastener material being a structural adhesive which will bond to the elastomeric material and to the material forming the groove and will not necessarily be rigid but which can be rigid. A fourth possible combination is an elastomeric seal ring and a chemical fastener material which will cure to a substantially rigid material and will not bond or adhere to the seal ring or the material forming the groove. In this combination, the chemical fastener secures the seal ring in the groove by wedging-like action between divergent side walls of the groove.

By way of example of these possibilities, the chemical fastener can be a modified epoxy material having the desired adhesive and hardness characteristics. In practice, it has been found that an epoxy material is suitable however other suitable materials can be used. As a specific example of materials usable to practice this invention a highly flexible two part, room temperature curing modified epoxy structural adhesive marked as "Scotch-Weld", product number 2216 B/A (manufactured by the Minnesota Mining and Manufacturing Co. of St. Paul, Minnesota) can be used as the chemical fastener and Buna-N or epichlorohydrin can be used as the seal ring to produce a structure as described in the above third possible construction. The chemical fastening material must necessarily be anerobic so that it will cure in a chemical reaction without the presence of oxygen for total polymerization in the groove around the seal ring. The specific time for curing the chemical fastening material into its finished condition will obviously depend upon the specific material used and the temperature condition of the assembly.

FIGS. 3 and 4 show a gate valve and the portion of a seat ring therefor which are provided with the novel valve seal structure of embodiment, (1), of this invention. Gate valve 90 includes a valve body 92 having a gate member 94 movably mounted therein with a valve stem 96 secured to gate 94 and extending through the body for moving gate 94. The novel seal structure is indicated generally at 98 and located on valve seat rings 100. Seat rings 100 are mounted in valve body 92 with inner portions thereof adjacent to the sealing surface portion of gate 94. FIG. 4 shows a portion of seat ring 100 in transverse cross section in the area of the seal ring structure 98, with seal ring 22A shown in dashed lines therein. The groove mounting seal ring 22A is formed in seat ring 100 around the flow passageway through the valve and it opens onto seat ring face surface 102 which faces gate 94. Convex surface 76A extends beyond seat ring face surface 102 to contact sealing surface portions of gate 94. It is to be noted that the specific structural details of the seal ring, as well as details of the method of making the seal ring structure for the gate valve are the same as that described above in conjunction with ball valve 10 and for brevity such is not repeated here. Additionally, it is to be noted that seal ring structure 22A can be constructed with an elastomeric or a plastic type of seal ring and with the bonded or non-bonded chemical fastener material as described above.

Another embodiment, (2), of the novel valve seal retaining structure and method of manufacture of this invention is shown in FIGS. 10-15, on sheet 3 of the drawings. Gate valve 110 includes a valve body 112 which has a flow passageway therethrough and seat rings 114 positioned on opposed sides of a movably mounted gate 116. The novel seal ring structure of this embodiment, (2), of this invention is indicated generally at 118 and shown in a groove 109 in the ends of seat rings 114. Inner end portions of the individual seal rings 120 contact sealing surface portions of gate 116.

Figure 10:
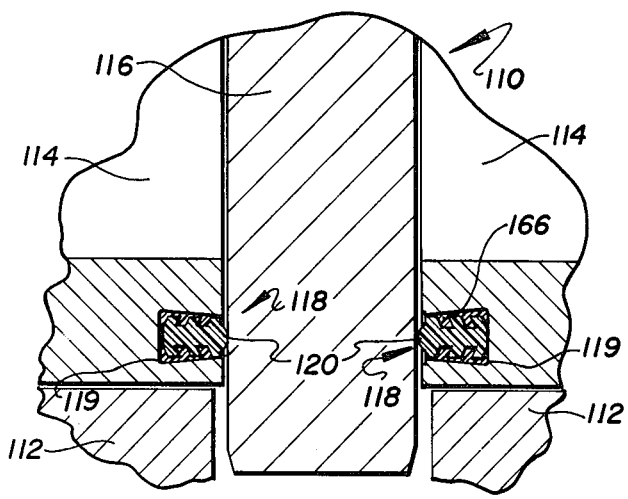
FIG. 10 is a cross-sectional view of a portion of a gate valve employing another structural embodiment of the seal ring of this invention positioned in grooves in seat rings adjacent to opposite sides of the gate.
Figure 12:
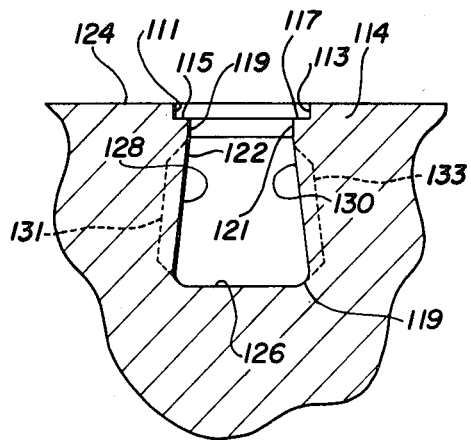
FIG. 12 is a transverse cross-sectional view of a grooved member for mounting the second embodiment of the seal ring of this invention.

FIG. 12 shows the seal ring mounting groove 109 as illustrated in FIG. 10 in an enlarged cross section. Groove 109 has an open end portion 122 opening to surface 124 of seat ring 114, a closed end portion defined by an end or bottom wall 126, and opposed side walls 128 and 130. Groove open end portion 122 has a recessed portion opening to surface 124. This recessed portion has opposed sides 111 and 113 which join inwardly extending ledge portions 115 and 117 which in turn join narrow side wall portions 119 and 121 which connect to divergent side walls 128 and 130, respectively. Side walls 128 and 130 are divergent relative to the open end portion 122 toward the bottom wall 126. The width of groove 109 or the distance between side wall 128 and 130 is greater at the bottom portion of the groove than at the top or open end portion thereof. It is to be noted that side walls 128 and 130 and bottom wall 126 do not have to be smooth surfaced walls. They can be, in fact, rough machined surfaces and are not necessarily straight or flat in the case of bottom wall 126.

Figure 11:
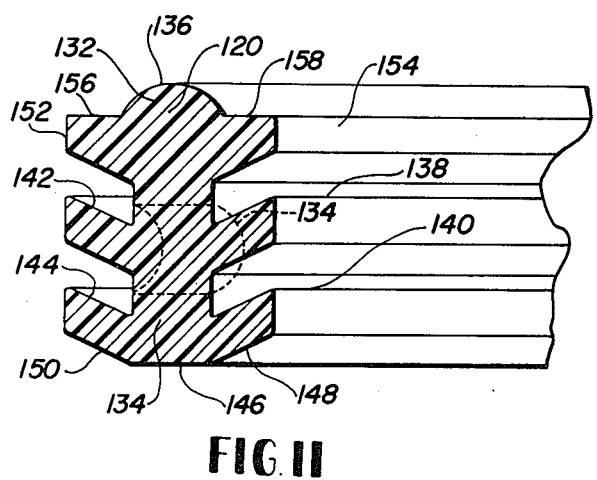
FIG. 11 is a perspective view of the second embodiment of the seal ring of this invention showing a portion of it in transverse cross section.
Figure 14:
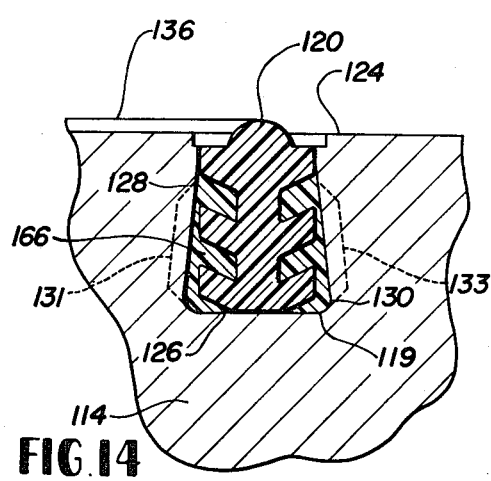
FIG. 14 is a cross-sectional view of the second embodiment of the seal ring secured in the gate valve seat ring member in its installed position.

FIG. 11 shows a portion of seal ring 120 in a quarter section view alone in its free or unrestrained position. Seal ring 120 has an inner end portion 132 on the end portion thereof which when installed lies closest to the valve member, and it has an outer portion 134 which is the portion that lies fartherest away from the valve member when the seal ring is installed. Seal ring inner portion 132 has a convex portion 136 defining the shape of the inner end portion thereof. The surface of convex portion 136 in use contacts the sealing surfaces of the valve member. Seal ring outer portion 134 has a plurality of grooves therein on its opposed sides which open to the inner annular portion of the seal ring and to the peripheral portion of the seal ring. The seal ring construction shown in FIG. 11 has two grooves 138 and 140 formed in the seal ring and opening into the inner annular portion thereof, and the seal ring also has another pair of grooves 142 and 144 opening to a peripheral side of the ring. All of the grooves 138, 140, 142, and 144 are shaped somewhat similarly with the closed end portions of the grooves displaced toward the seal ring outer end 146 relative to the open portion of the grooves. The grooves can be constructed with essentially parallel sides as shown or with the sides of the grooves tapered as desired. Groove outer end 146 is essentially flat in its center portion with the inner annular end edge surface portion 148 and outer peripheral end edge surface portion 150 being turned toward the opposite end portion of the seal ring as illustrated. Grooves 138 and 142 are spaced from the outer end of the seal ring by side portions 152 and 154. The inner end of seal ring 120 has essentially flat surfaces 156 and 158 connecting side surfaces 152 and 154, respectively, and both surfaces 156 and 158 joining convex surface 136. Seal ring 120 can be constructed with a radially disposed transverse passageway. If desired, a plurality of transverse passageways can be formed in seal ring 120 to provide communication for the chemical fastener material. Seal ring 120 can be molded or machined or formed by some other method into an annular member having a free form cross-sectional shape as shown in FIG. 11. Seal ring 120 can be extruded in a rope-like fashion and spliced to form the annular member of the desired dimension.

Figure 13:
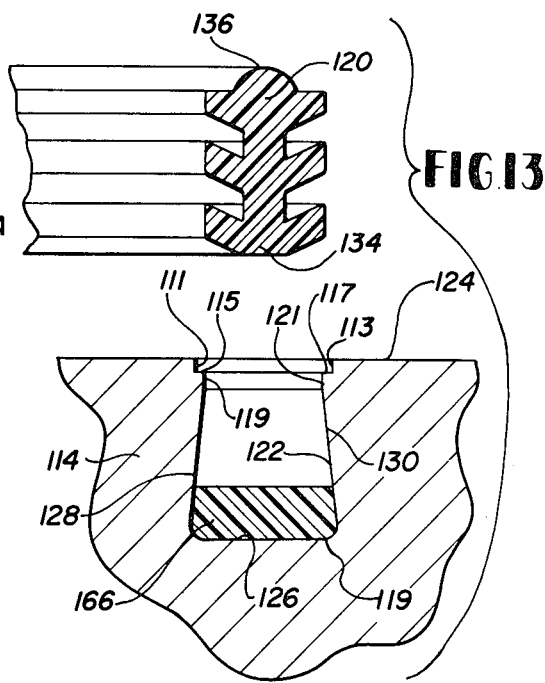
FIG. 13 is an exploded view of the second embodiment of the seal ring positioned outwardly of the grooved gate valve seat ring having a chemical fastener in the closed end portion thereof.

FIG. 13 shows seal ring 120 in a position aligned with the opening of groove 109 prior to its being inserted into the groove. A chemical fastener material 166 is a flowable material having a consistency somewhere between that of a liquid and a semi-solid. Obviously, the specific consistency of the chemical fastener material will depend upon the specific material used and this will obviously vary depending upon the material of the seal ring and the particular service application for a valve. The quantity of chemical fastener material 166 placed in the groove must be at least sufficient to fill all of the space in the groove which will not be occupied by seal ring 120 which is positioned in its final resting position. As seal ring 120 is moved into groove 109 the chemical fastener material 166 is displaced into upper portions of the groove filling all voids around grooves 138, 140, 144, and 142 and filling all of the groove between groove sides 128 and 130 which is not occupied by the seal ring. It is to be noted that an assembly fixture similar to that shown in FIG. 9 and described above in conjunction with the first described, (1), embodiment of this invention can be used here to position seal ring 120 in groove 109 for curing. The assembly fixture is used in the same manner as described above with a suitable release agent applied as needed to prevent undesired adhering of the chemical fastener. The assembly fixture can be left in place until the chemical fastener material has completely cured or at least until it has substantially cured to a state which will at least retain seal ring 120 in its final resting position in the groove until the material completes curing.

The specific chemical fastener and the specific seal ring used in this embodiment, (2), of this invention depends upon the general characteristics set forth above and includes the general characteristics of the desired seal, (rigid or resiliently flexible), and the specific application for the valve. In this embodiment, (2), as in the above described embodiment, (1), there are four distinct and possible variations obtainable and the seal characteristics by changing the general composition of the seal ring and the chemical fastener material. For brevity, the four combinations will not be described here, however, it is to be understood that these combinations are applicable.

Figure 15:
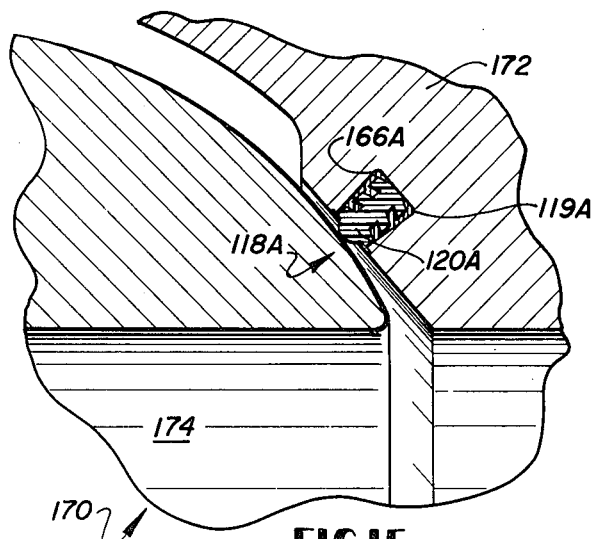
FIG. 15 is a cutaway view of a portion of a ball valve employing the second embodiment of the seal ring of this invention mounted in a groove in a member adjacent to the ball.

FIG. 15 shows the novel seal ring construction and structure of this embodiment, (2), of this invention employed in a ball valve which is indicated generally at 170. Ball valve 170 includes a body 172 with a flow passage therethough enclosing a circular plug or ball valve member 174 rotatably mounted therein. Ball valve member 174 has a passageway therethrough alignable with the flow passageway of valve body 172. The novel seal assembly 118A of this invention is constructed in valve body 172 and includes a groove 109A in the valve body which encloses a portion of seal ring 120A and chemical fastener material 166A. Groove 109A is formed in the valve body around the flow passageway opening toward ball 174. Seal ring 120A and groove 109A are constructed the same as seal ring 120 and groove 109 as described above. In assembling seal assembly 118A an assembly fixture similar to that described above can be used to position seal ring 120A in the desired position. It is to be noted that in using the novel seal assembly 118A of this embodiment, (2), of this invention it does not have to be constructed with the groove formed in the valve body, it can be constructed with the groove in a removable seat ring member and the seat ring member mountable in the valve body similar to the construction shown in FIG. 1.

It is to be noted that the seal rings described in this embodiment, (2), can be plastic or elastomeric and bonded or not bonded to the valve structure as described in the four possibilities set forth in the description of the first embodiment, (1), of this invention. Likewise, the same choices of materials on construction apply to this embodiment, (2), as described with the first described embodiment, (1).

In the manufacture of the valve seal retainer and of this invention, it is obvious that it can be easily constructed in a valve seat ring or directly in a valve body to achieve the end product. In the construction of the groove it is to be noted that such does not require precise machining and finishing techniques as is often required in valve seat construction because of the use of a chemical fastener material to secure the seal ring in the groove. One obvious advantage of this invention over the prior art is the ease of assembly and manufacturing. Another advantage of this invention over the prior art is that the seal ring is easily replaceable either in a valve body or in a seat ring. Because the seal ring and its chemical fastener are formed of synthetic materials, they can be easily removed from the groove by heating, burning or gouging or by a combination thereof. With the proper selection of materials, a chemical fastener and a seal ring can be selected such that excessive heat alone will deteriorate materials to allow their removal from the groove by simple scraping or dislocation by air pressure. This feature of the invention makes it quite attractive for field servicing and for replacement of seal rings when they are damaged in the manufacturing operation, thereby obviating high scrapping expenses often incurred with precisely machined parts.

In practicing the method of making a valve of this invention, it is seen that the method can be accomplished with less difficulty than other methods currently used for rolled in, pressed in, and otherwise precisely fitted valve sealing rings and sealing structures. The method of this invention has an advantage over the prior art in that it can be accomplished with relatively simple tools and by using parts which are machined, without extremely fine tolerances. An additional advantage over the prior art is that the method is by far more adaptable to mass production assembly line techniques than prior art seat structures having small tolerances requiring precisely controlled manufacture and assembly of valve seats.

I claim:

1. A method of making a seat structure for a valve having a body with a passageway therethrough, a cavity in said body, a valve member mounted in said cavity for movement between open and closed positions relative to said passageway, comprising the steps of:

first forming a groove in a seal ring supporting portion of said valve body about the passageway with the groove having divergent side walls, then partially filling the groove with a chemical fastener material, next inserting an annular resilient seal ring having a lateral passageway between opposed sides thereof within the groove adjacent the divergent side walls and into the chemical fastener material so that the chemical fastener material flows through the lateral passageway and between the side walls and adjacent sides of the resilient seal, and curing the chemical fastener material in said groove and said lateral passageway for a predetermined time until the seal ring is anchored within said groove between the divergent side walls thereof.

* * * * *